Feb. 17, 1942. G. M. WRIGHT 2,273,077
MEANS AND METHOD OF PRODUCING SOUND EFFECTS
Filed Oct. 10, 1938
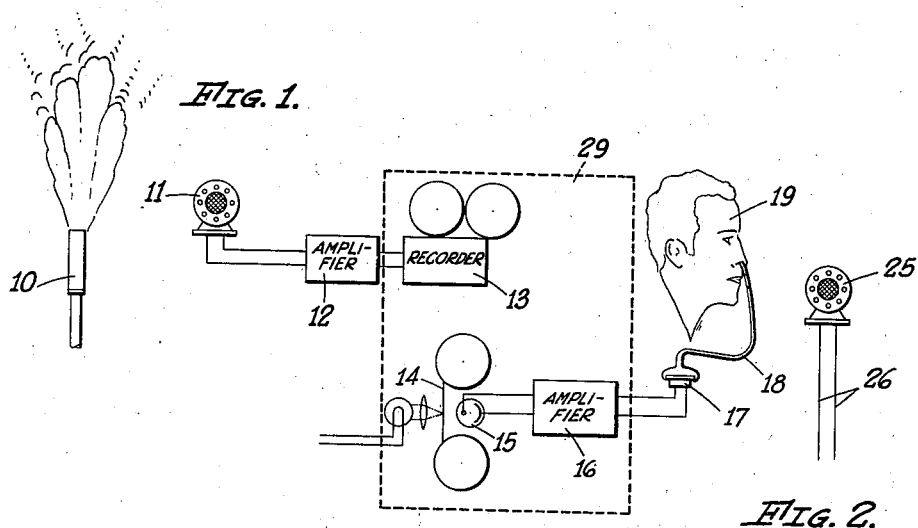
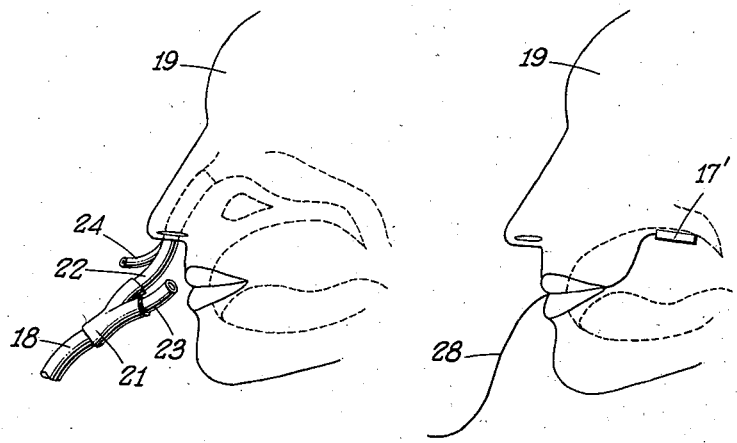
Inventor
GILBERT M. WRIGHT
By
Attorney Patented Feb. 17, 1942

2,273,077

UNITED STATES PATENT OFFICE 2,273,077

MEANS AND METHOD OF PRODUCING SOUND EFFECTS

Gilbert M. Wright, Los Angeles, Calif.

Application October 10, 1938, Serial No. 234,121

6 Claims. (Cl. 272—14)

The present invention relates to methods and means of creating novel sound effects which are particularly well adapted for use in motion picture work, radio broadcasting and other forms of entertainment. The method and apparatus of this invention permit a human to modulate words, phrases, etc., so as to render them understandable, the pitch, timber, frequency and range of the carrier sound used by the person in uttering the words or phrases being vastly different from the normal frequency or pitch of the human voice. Many valuable and novel effects can thus be produced since the carrier sound, irrespective of its frequency range, modulation or characteristic, can be converted into articulate speech.

Generally stated, the method of this invention comprises the steps of liberating a sound within the air passages of the human head, the sound being of any desired range of frequency, composition, modulation or pitch, and then permitting said sound to emanate from the mouth of the head while molding the sound with the tongue and lips so as to impart linguistic meaning to the sound. Sounds thus produced can, as heretofore stated, be used in broadcasting, recording, motion picture work, vocal work, the production of accompaniments for animated cartoon photoplays, and many other purposes.

An object of the invention is to provide a method of creating novel sound effects.

A further object is to provide means and methods whereby a variable, modulated organization of audible vibrations suggestive and characteristic of a sound other than human may be caused to articulate and have liguistic meaning.

A still further object is to disclose and provide means and methods whereby a human may be caused to articulate and speak in sounds which are cognate to a source other than human and which are suggestive and characteristic to permit an audience to immediately associate the sound with its true source.

These and other objects, advantages, adaptations and uses of the invention will become apparent to those skilled in the art from the following description. In order to facilitate understanding, reference will be had to the appended drawing, in which:

Fig. 1 diagrammatically represents a preliminary step which may be employed.

Fig. 2 diagrammatically represents the means employed in carrying out one of the modifications of the method of this invention.

Fig. 3 is an enlarged view showing the location of certain elements during the production of the novel effect.

Fig. 4 is another view of a human head provided with devices adapted to permit the performance of the method.

A human voice is generated by the passage of air through the larynx and is restricted in pitch. Ordinarily, a deep bass voice consists of vibrations ranging from about 100 to 300 cycles per second whereas a soprano voice will range from about 250 to 800 cycles per second. Generally stated, therefore, a human voice is only capable of emitting vibrations of from about 100 to 800 cycles and it will be noted that no one person can speak within the complete range of 100 to 800. The articulation of the sound into speech is performed by controlling movement of the lips, tongue and palate.

The methods and process of this invention permit a human to articulate or speak in frequencies which may be materially below 100 cycles, say as low as 20 cycles, and at the same time also articulate in frequencies which may be as high as 5000 cycles. Furthermore, the valuable novelty of this invention is due to the fact that the words uttered by the human in accordance with this invention carry a significance other than that produced by the words themselves; in other words, the sound which is molded by the lips and tongue to produce articulate speech may be a tune or melody which is readily recognizable by an audience in addition to the portent of the words which have been carved or molded out of the melody.

Many entertainment possibilities are offered as a result of the process of this invention in the production of animated cartoons, fanciful incidents often occurring. It may be desirable, for example, to represent a waterfall as speaking. The method of this invention permits the recording of words which are incidental but which are composed of the characteristic and descriptive sound of a waterfall and such recording can then be used with advantage in synchronous reproduction with the exhibition of the animated cartoons in which the pictorial representations of the waterfall are embodied.

As stated hereinbefore, the method comprises the liberation of desired suggestive and characteristic audible vibrations within the vocal cavities or air passages of the human head, and then molding such sounds as that emanating from the mouth, with the tongue and lips so as to produce articulate sounds having linguistic meaning. Numerous methods of producing this result may be employed. In Fig. 1 the sound of a steam whistle indicated at 10, is picked up by a microphone 11 and the electrical impulses representing the combination of vibrations which are characteristic of and emanating from the steam whistle are then passed to an amplifier 12 from whence the electrical impulses may be sent to a recording device such as the recorder 13 in which the electrical impulses are caused to modulate light which is then photographically recorded upon a strip of film. It is to be understood, however, that the recording of any desired carrier sound may be performed in any of the known methods—photographically, mechanically, electromagnetically, or otherwise—and the photographic recording is being mentioned only for purposes of example.

When it is desired to now utilize the steam whistle sound in producing articulate speech, the film 14 on which the sound has been recorded may be advanced past a scanning light, the light being thus modulated by the record, the modulated light then impinging upon the photoelectric pick-up 15, which is suitably connected with an amplifier 16, the amplifier then supplying electrical impulses representative of the sound to a receiver 17. The receiver may be of any desired form, i. e., either dynamic, of the diaphragm type, or of any other suitable character, but preferably the receiver should be capable of handling sounds of considerable amplitude and wide range of frequency.

The sound waves generated by the receiver 17 may then be conveyed as by means of a flexible hose or tube 18 to the vocal cavities of a human head such as the head of the person 19. In Figs. 2 and 3 the conduit 18 is provided with two branches or smaller tubes adapted to be inserted into the nasal cavity. For example, the tube 18 may be provided with a Y connection 21 leading to the smaller nasal tubes 22 and 23. Such nasal tubes may include a passageway or air inlet 24 through which the person 19 may inhale and exhale when desired.

The volume of sound supplied to the vocal cavities of the person 19 through the conduit 18 is such that when the person maintains his mouth closed, no sound emanates, even though the receiver 17 is being actuated and is reproducing sound from the record 14. In the event the person 19 now speaks by simply moving his lips and tongue and without exhaling so as to energize his own vocal cords, then the sound waves supplied to the vocal cavities of the person will be molded by the action of the tongue and lips into articulate speech, which speech can now be picked up by the microphone 25 and sent by leads 26 to a suitable amplifier, reproducer, recording instrument, or the like.

Especial attention is called to the fact that during the articulation of the carrier sound into speech, the person 19 is not employing his normal speaking voice and is not utilizing his vocal words or larynx. As a matter of fact, it is not necessary for the person 19 to breathe during articulation of sound since the sound waves are being supplied by the receiver 17, conduit 18, and nose tubes 22 and are merely modulated into words by the action of the vocal cavity. Attention is also called to the fact that the original audible sound, such as the sound generated by the whistle 10, although of a predetermined general character, is an inarticulate sound but by means of the apparatus and in accordance with the method of this invention, such inarticulate sound or organization of audible sound waves is converted into articulate form, the receiver or electroacoustic transducer 17 liberating the inarticulate sound within the vocal cavities of the human head at an amplitude sufficient to permit such organization of sounds to be molded by the tongue and lips into articulate form. Furthermore, the original source of the inarticulate sound is independent of the person 19 who molds the sound waves into articulate form.

In the manner described and by means of the devices shown, the sound emanating from the lips of the person 19 now consists of the sound of a steam whistle molded and articulated into speech, such speech being understandable linguistically and at the same time the audience or hearer is cognizant of the fact that such words are not being uttered by a human voice but instead a steam whistle is speaking. The unusual character of the effect thus produced is of great value in entertainment fields. It will be appreciated that instead of a steam whistle, the characteristic, distinctive, suggestive or descriptive sound used as the carrier may comprise any variable, modulated organization of audible vibrations such as, for example, those emanating from a waterfall, babbling brook, wind of high velocity, a symphony orchestra, an individual musical instrument playing a melody which is then recognizable as such during articulation of linguistic sounds, etc. As an example, at the beginning of a broadcast during which a nationally known symphony orchestra is to present a concert, the announcer may, by the use of a recording made by the symphony orchestra of the Rienzi Overture, announce: "This is the Blank Symphony Orchestra speaking" and in fact that will be the case.

Instead of passing the carrier sound from an external source into the vocal cavities of a human through the nose, such sound may be caused to be discharged within the vocal cavities of the mouth by introducing the end of conduit 18 into the back part of the mouth. Instead of forming the sound by an externally positioned receiver 17 and then conveying the audible vibrations into the vocal cavities, the receiver 17 may be placed directly within the mouth.

For example, in Fig. 4 a very small receiver 17' is shown positioned by means of a suitable adhesive within the mouth, the adhesive causing the receiver to adhere to the back part of the palate. Such receiver 17' is connected with an amplifier by means of the electrical conduit 28 which, because of its small diameter, does not impede lip or tongue movement.

It is to be understood that the sound generated by the receiver 17 or receiver 17' need not necessarily come from a prior recording but instead may come directly from the source producing the carrier sound. In other words, by referring to Figs. 1 and 2 it will be evident that the amplifier 12 may be directly connected to the receiver 17, thereby emanating from the sphere of action of the instrumentalities shown within the dotted line 29. In this modification the person 19 will be at a point suitably removed from the microphone 11 so that the sound picked up by the microphone 11 will not be directly picked up by the microphone 25 into which the person 19 is speaking.

In addition to the various methods shown and described, other methods will occur to those skilled in the art. All changes and modifica-

I claim:

1. An apparatus for producing novel sound effects comprising: means for converting a variable, modulated organization of audible vibrations suggestive and characteristic of a source other than human into electrical impulses; a receiver adapted to convert said electrical impulses into audible sound waves in a gaseous medium, said receiver being operably associated with said means; and tubular hollow means for conveying said sound waves from said receiver into the vocal cavities of a human head, whereby said sound waves can be molded by the tongue and lips into articulate form without destroying the characteristics of said sound waves which render them suggestive of a source other than human.

2. In a method of producing novel sound effects by forming articulate words from an inarticulate organization of sound waves characteristic and suggestive of a source other than human, the steps of: independently and electrically generating predetermined, inarticulate organizations of sound waves in a gaseous medium at a point external to the human body, said sound waves being incapable of being produced by the human larynx, and then conveying said sound waves to and liberating the same within the vocal cavities of the human head whereby said sound waves can be molded by the tongue and lips into articulate form.

3. In combination, means responding to electrical currents representing audio frequency sound waves having magnitudes of amplitude and frequency variation of the order of those occurring in speech and music, said means generating mechanical energy corresponding to such sound waves, and means for introducing said mechanical energy into the vocal parts of the human body for modulation upon movement of said vocal parts.

4. In combination, means comprising a record of audio frequency sound waves having magnitudes of amplitude and frequency variation of the order of those occurring in speech and music, means for translating said record into corresponding electrical currents, and means for translating said electrical currents into mechanical energy of corresponding frequency, and for introducing said energy into the vocal parts of the human body for modulation resulting from relative movement of vocal parts of the body.

5. In combination, a source of electrical currents corresponding to sound waves of arbitrary amplitude and frequency patterns, said source comprising means having a record thereon corresponding to said sound waves, and means for translating said record into corresponding electrical currents, a sound wave reproducer connected to said source, and a sound wave conduit connecting the sound wave outlet of said reproducer with the interior of the mouth.

6. The method of producing a sound effect which comprises generating sound waves outside of the mouth and corresponding to sound waves recorded on a phonographic or other record, introducing said sound waves into the vocal chambers through the mouth, and modifying said sound waves by silent operation of the vocal parts.

GILBERT M. WRIGHT.